United States Patent [19]
Merritt

[11] Patent Number: 5,301,817
[45] Date of Patent: Apr. 12, 1994

[54] MOTORCYCLE SECURITY STAND

[76] Inventor: Scott G. Merritt, 1055 Aviation Dr., Lake Havasu City, Ariz. 86404-2417

[21] Appl. No.: 110,221

[22] Filed: Aug. 23, 1993

[51] Int. Cl.⁵ .............................................. A47F 5/00
[52] U.S. Cl. ...................................... 211/5; 70/235; 211/20
[58] Field of Search ................ 211/5, 20, 24; 70/234, 70/235

[56] References Cited

U.S. PATENT DOCUMENTS

| | | | |
|---|---|---|---|
| 565,058 | 8/1896 | Westphal | 70/234 |
| 3,881,680 | 5/1975 | Lietaert, Jr. | 248/499 |
| 4,015,718 | 4/1977 | Bernard | 70/235 |
| 4,182,454 | 1/1990 | Tohms | 211/5 |
| 4,437,597 | 3/1984 | Doyle | 211/20 X |
| 4,830,167 | 5/1989 | Lassche | 194/247 |

Primary Examiner—Robert W. Gibson, Jr.
Attorney, Agent, or Firm—Jack C. Munro

[57] ABSTRACT

A stand which is to be placed on a supportive surface which is to engage in a supporting manner with the front wheel of a motorcycle. The stand is to support the motorcycle in its normal upright position. The stand includes a backbone member within which the front wheel of the motorcycle is to be cradled in a closely conforming manner. Associated with the backbone member is a right side support and a left side support which are located in a facing relationship with the backbone member located there between. Both the right side support and the left side support are adjustably mounted on the backbone member so as to vary the spacing between the supports so as to accommodate different sizes of tires of motorcycles.

9 Claims, 3 Drawing Sheets

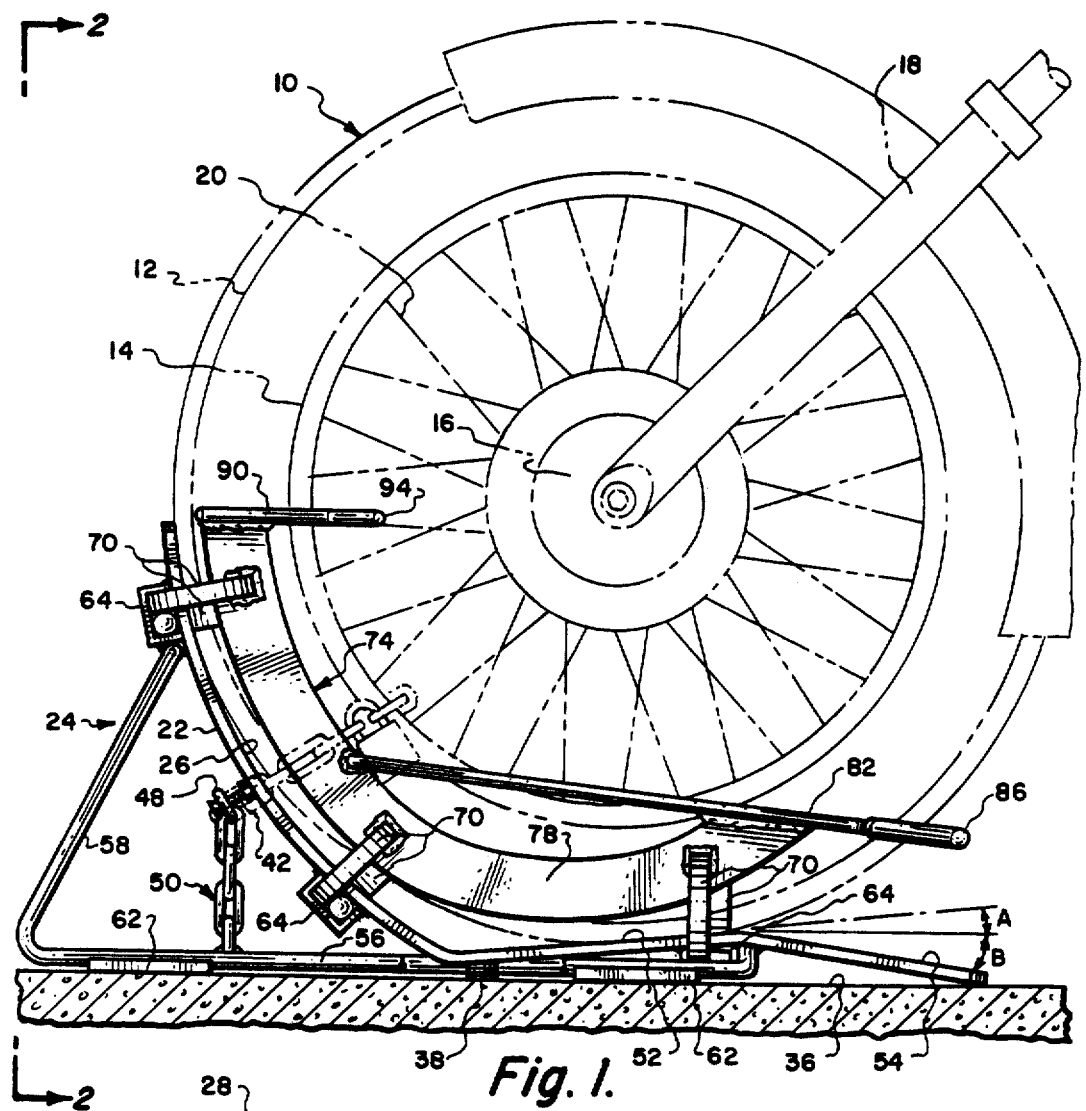
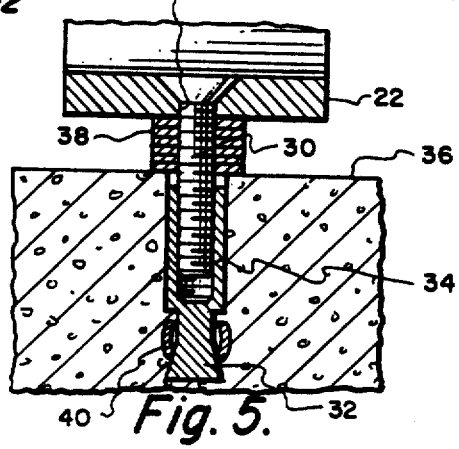
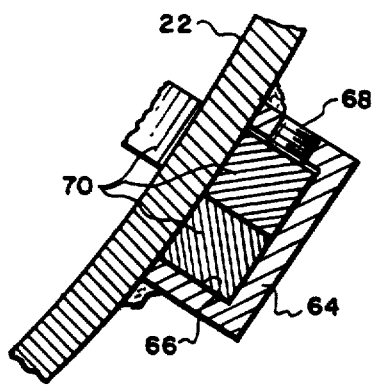

MOTORCYCLE SECURITY STAND

BACKGROUND OF THE INVENTION

1) Field of the Invention

The field of this invention relates to a motorcycle storage stand which is designed to support the motorcycle in its normal upright manner and can be utilized in conjunction with a separate locking device to secure the motorcycle to the stand to prevent unauthorized removal and usage of the motorcycle.

2) Description of the Prior Art

Owners of high priced motorcycles are aware of the fact that a skilled and well equipped thief requires less than sixty seconds to steal a motorcycle. Two strong and able bodied thieves can lift up a motorcycle that is not secured to the ground and place it within a truck or van, even when both wheels of the motorcycle are locked.

Besides the potential thievery of a motorcycle, there is a need to have a motorcycle stored in an upright position. This storage frequently occurs within the garage of a house or adjacent the garage area of the house exteriorly of the house. It is desirable to store the motorcycle in its normal usage position which is in an upright position and also make it virtually impossible to be accidently knocked over. When needed, a locking means is to be connected to the stand with the stand being securable to a supportive surface such as a concrete floor.

SUMMARY OF THE INVENTION

A motorcycle security stand which includes a base with this base to be secured by being bolted to an imbedded anchor located within a concrete or other similar type of supportive surface. Mounted on the base, such as by being welded thereto, is a backbone member with this backbone member including a forward ramp section. The front wheel of the motorcycle is to be moved up the ramp section and come to rest within a recess formed within the backbone member with the backbone member having a shape closely conforming to the front tire of the motorcycle. Attached to the backbone member are side supports and there being a right side support to engage with the right side of the motorcycle tire and a left side support engaging with the left side of the motorcycle tire. These side supports are to be adjustable relative to each other to vary the spacing there between so as to accommodate to wider or narrower sizes of motorcycle tires. These side supports are to be fixedly secured in position on the backbone member when the desired position has been obtained. Both the side supports include upper and lower guides so as to facilitate entry of the motorcycle front or rear wheel in conjunction with the backbone member even when the wheel is being directed in a slightly misaligned manner in conjunction with the stand. A locking cable, that is usable with a separate padlock type of locking device, is mounted on the backbone member and is to be usable by being wrapped through the spoke section of the motorcycle wheel so as to securely lock the front wheel of the motorcycle to the stand when such locking means is desired. In order to avoid scarring occurring on the supportive surface, the lower surface of the base includes resilient foot pads which rest directly on the supportive surface and actually locate the metallic structure of the base in a slightly spaced position from the supportive surface.

One of the objectives of the present invention is to construct a security stand for a motorcycle which defies theft of the motorcycle within a reasonable period of time.

Another objective of the present invention is to construct a motorcycle stand which can be purchased by the user at a reasonable cost and installed quickly at any desired home or business location.

BRIEF DESCRIPTION OF THE DRAWINGS

FIG. 1 is a side, elevational view of the motorcycle security stand of the present invention showing a motorcycle front wheel being supported there within;

FIG. 5 is a transverse, cross-sectional view taken through the mid section of the backbone member incorporated in the motorcycle stand of the present invention taken along line 5—5 of FIG. 3;

FIG. 6 is a longitudinal, cross-sectional view through the forward section of the backbone member of the motorcycle stand of the present invention taken along line 6—6 of FIG. 3;

DETAILED DESCRIPTION OF THE SHOWN EMBODIMENT

Figure 2:
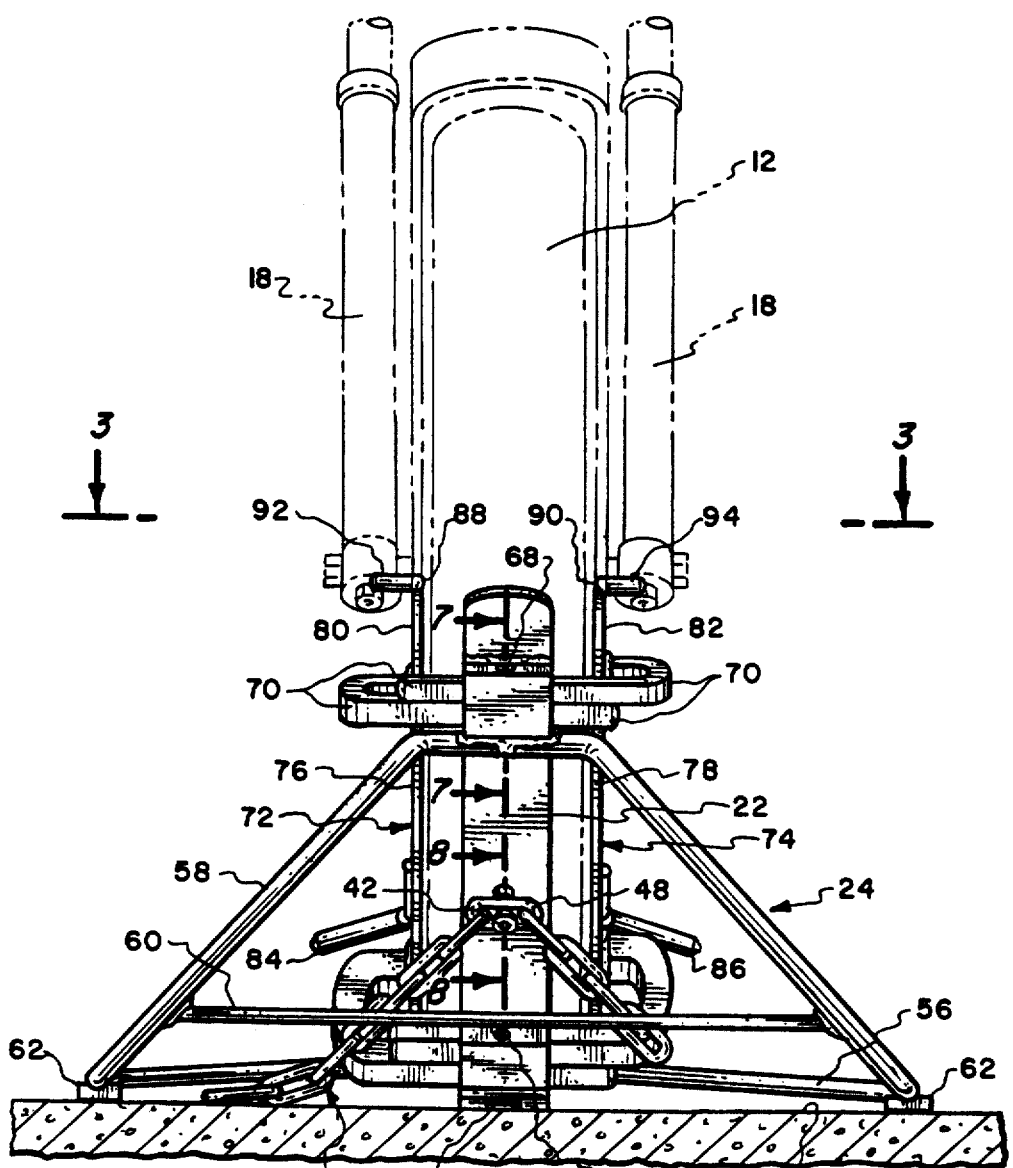
FIG. 2 is a front view of the motorcycle stand of the present invention taken along line 2—2 of FIG. 1.
Figure 7:
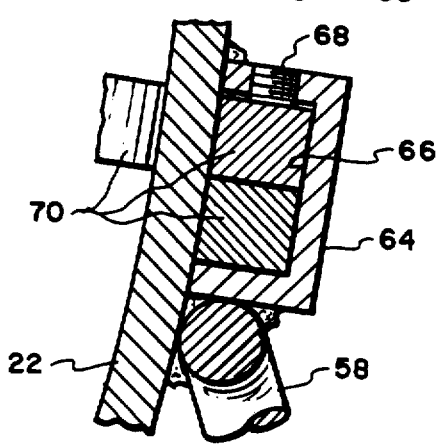
FIG. 7 is a longitudinal, cross-sectional view through the outermost portion of the forward section of the backbone member incorporated within the motorcycle stand of the present invention taken along line 7—7 of FIG. 2.
Figure 8:
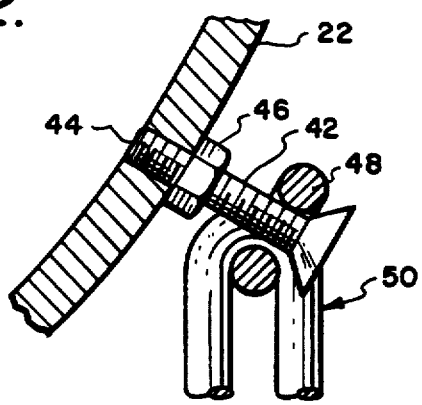
FIG. 8 is a cross-sectional view showing more clearly the locking chain attachment arrangement incorporated within the motorcycle stand of the present invention.

Referring particularly to the drawings there is shown the front wheel 10 of a motorcycle which includes a tire 12, a tire rim 14, a hub section 16 with a front fork 18 connecting centrally within the hub section 16. Between the hub section 16 and the rim 14 is located a spoke area 20. The front wheel 10 is to connect with a backbone member 22 of the stand 24 of this invention.

A portion of the periphery of the tire 12 is to rest against the forward section of the backbone member 22 which is defined as an arcuate recess 26. The backbone member 22 has a mid section which includes a hole 28. Within the hole 28 is to be located a bolt type of fastener 30. The bolt type of fastener 30 is to threadingly connect with an insert 32 that is to be forceably driven within a hole 34 formed within a supportive surface 36. Typical material for the supportive surface would be cement. In between the supportive surface 36 and the backbone member 22 is a spacer 38 which can comprise a series of stacked washers. The insert 32 includes an expandable sleeve 40 which is to facilitate securement of the insert 32 within the hole 34.

A threaded fastener 42 is secured within a threaded hole 44 formed within the backbone member 22. The fastener 42 extends outward away from the exterior surface of the backbone member 22. The fastener 42 is fixed in position by means of a nut 46. A link 48 of a chain 50 is confiningly connected to the fastener 42. The chain 50 is to be extended through the spoke area 20 of the front wheel 10 with the ends of the chain 50 being connected together through a locking device such as a padlock thereby fixedly securing the front wheel 10 to the stand 24 to deter against unauthorized removal of the motorcycle from the stand 24.

Extending aft from the mid section of the backbone member 22 is a flat section 52 which can be defined as the exit ramp for the front wheel 10. Relative to horizontal or the plane of the supportive surface 36, this flat section 52 assumes some slight incline angle A such as five degrees. This inclination is just to be sufficient so that the wheel 10 will tend to remain in conjunction with the tire 1 is located within the recess 26. However, the angle A is not so steep that it will retard to any sufficient degree the manual removal of the front wheel 10 from the recess 26 when such is desired.

Integrally connecting with the flat section 52 is an entry ramp defined by flat section 54. The outer end of the flat section 54 is to be located very near and may physically contact the supportive surface 36. Flat section 54 forms an angle B which should be about ten degrees relative to the supportive surface 36. Flat section 54 is defined as the entry ramp with it being required that the tire 12 be rolled over this entry ramp so that the tire 12 can come to rest within the recess 26.

The backbone member 22 will normally be constructed of metal. The backbone member 22 is to be welded to a base 56 which constitutes a frame which includes an upstanding A-shaped section 58. This A-shaped section 58 includes a cross brace 60. Mounted on the base 56 are four in number of resilient foot pads 62 which are located in a spaced apart manner. These foot pads 62 are to rest directly on the supportive surface 36. These resilient foot pads 62 are to prevent scarring of the supportive surface 36 by the stand 24.

Fixedly mounted on the exterior surface of the backbone member 22 are a plurality (three in number) of rib retainers 64 which are located in a spaced apart manner. Each of the rib retainers 64 define a rectangularly shaped open-ended chamber 66. Connecting with each rib retainer 64 is a set screw 68 with this set screw 68 either being threadably secured within the rib retainer 64 itself or being threadably secured through the backbone member 22. Each chamber 66 is to have a pair of ribs 70 located therein in a close confining manner. Each of the ribs 70 are basically U-shaped with one end of the U being slidably located within the chamber 66 and the opposite end being secured as by welding to either a right side support 72 or a left side support 74. Three in number of the ribs 70 connect with the side support 72 and the remaining three in number of the ribs 70 connect with the side support 74.

Side supports 72 and 74 are basically identical with the exception of being a mirror image. The right side support 72 includes a sheet material flange 76. Side support 74 includes a sheet material flange 78. Both the flanges 76 and 78 are arcuate when viewed from the side such as is shown in FIG. 1 of the drawings. The amount of curvature of each of the flanges 76 and 78 is about equal to the periphery of the tire 12. The flange 76 abut against the right side of the tire 12. The flange 78 abuts against the left side of the tire 12.

Figure 3:
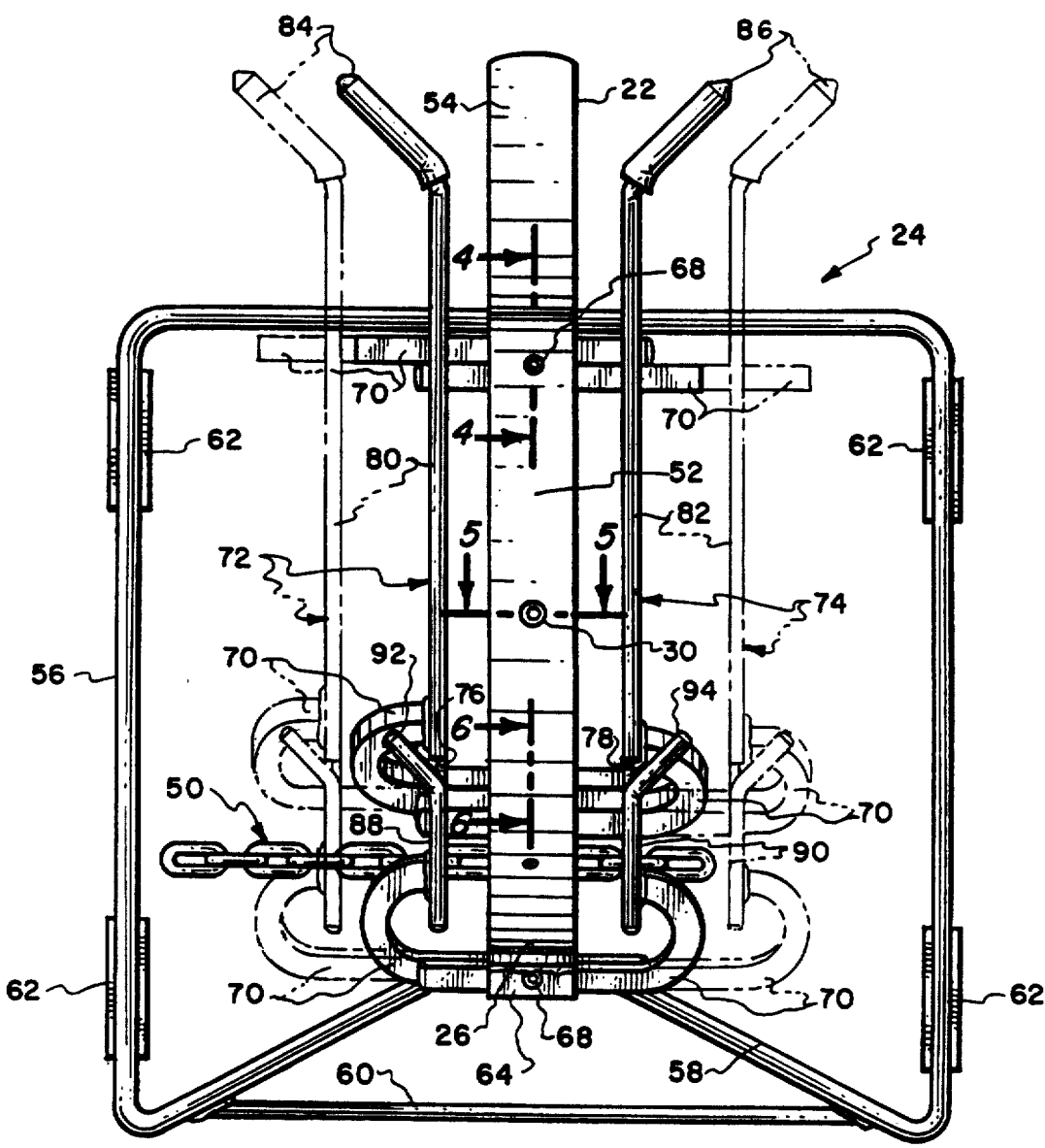
FIG. 3 is a top, plan view of the motorcycle stand of the present invention taken along line 3—3 of FIG. 2.
Figure 4:
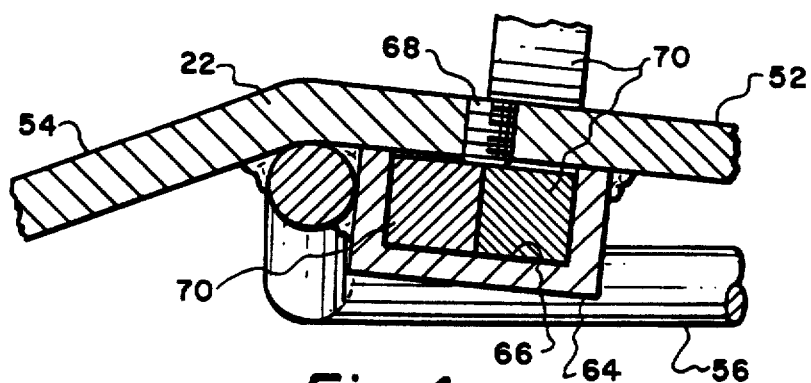
FIG. 4 is a longitudinal cross-sectional view through the ramp portion of the backbone member incorporated in the motorcycle stand of the present invention taken along line 4—4 of FIG. 3.

The flanges 76 and 78 can be moved toward and away from each other with this movement being permitted upon loosing of the set screws 68. With the set screws 68 loosened, the ribs 70 can be slid within their chambers 66 of their rib retainer 64. The flanges 76 and 78 can be located close together so as to accommodate to a narrow width of tire 12 or ca be located far apart as is shown in phantom lines in FIG. 3 to accommodate a rather wide tire 12 of a motorcycle front wheel 10. However, it has been assumed that the stand 24 of this invention is to be initially adjusted for the particular width of tire 12 of the motorcycle 10 that the stand 24 is to be used with. The flanges 76 and 78 are to be located at a distance apart equal to the width of the tire 12. Once the desired spacing between the flanges 76 and 78 has been obtained, the set screws 68 are to be tightened preventing any movement of the ribs 70 within the chamber 66.

Fixedly mounted on the flange 76 is a lower guide 80. A similar lower guide 82 is fixedly mounted on the flange 78. It is the function of the lower guides 80 and 82 to keep the front wheel 10 of the motorcycle confined between the flanges 76 and 78 as the front wheel 10 is being moved into its confining position between the flanges 76 and 78. If the wheel 10 is slightly misaligned as it is being moved in position with the stand 24, the outwardly flared end 84 of the guide 80 and the outwardly flared end 86 of the guide 82 will function to steer the front wheel 10 into its correct position with the stand 24. The lower guides 80 and 82 also function to keep the wheel 10 confined and the motorcycle upright even if the tire 12 goes flat.

Also fixedly mounted on the flange 76 is an upper guide 88. A similar upper guide 90 is fixedly mounted on the flange 78. The guide 88 also includes an outwardly flared end 92 with guide 90 including an outwardly flared end 94. It is the function of the guides 88 and 90 to make sure that the wheel 10 is in its proper position within the stand 24 with the outwardly flared ends 92 and 94 functioning to steer the front wheel 10 into its proper position with the stand 24.

The length of the backbone 22 is selected to capture approximately one-third of the circumference of the tire 12. This amount of connection with the tire 12 is sufficient to hold up even the heaviest touring motorcycle in an upright manner and keep it held in an upright manner, even if the motorcycle incurs an outside striking force. Also the interior curvature of the backbone member 22 is preselected to accommodate most of the known different radiuses of tires 12.

The ribs 70 have been designed to be of sufficient length to allow adjustment to fit up to a tire 12 seven inches wide. Simply lengthening of the rib 70 during manufacture could allow for even wider tires which are known to be used in drag racing motorcycles.

What is claimed is:

1. A motorcycle security stand to be located on a supportive surface, said motorcycle stand comprising:
    a base to be placed on the supportive surface;
    a backbone member mounted on said base, said backbone member adapted to function as a cradle for the front wheel of a motorcycle, said backbone member having a right edge and a left edge;
    a right side support and a left side support, said right-side support located at said right edge of said backbone member, said left side support located at said left edge of said backbone member, said right side support adapted to abut against the right side of the front wheel of a motorcycle, the left side support adapted to abut against the left side of the front wheel of a motorcycle; and a supporting rib assembly mounting both said right side support and said left side support on said backbone member, said supporting rib assembly being adjustable on said backbone member to vary the spacing between said right side support and said left side support, said supporting rib assembly being fixable in position on said backbone member.

2. The motorcycle security stand as defined in claim 1 wherein:
said backbone member including an arcuate section, said arcuate section closely conforming to the periphery of the tire of the front wheel of the motorcycle.

3. The motorcycle security stand as defined in claim 1 wherein:
said backbone member including a ramp section, said ramp section defining in part a recessed area within which the front wheel of the motorcycle is cradled.

4. The motorcycle security stand as defined in claim 1 wherein:
said right side support being essentially a mirror image of said left side support.

5. The motorcycle security stand as defined in claim 1 wherein:
said right side support including an upper and lower guide, said left side support including an upper and lower guide, each said upper guide being spaced furthest from the supportive surface, said upper and lower guides facilitating entry of the front wheel of the motorcycle to its location between said side supports.

6. The motorcycle security stand as defined in claim 1 including:
a locking chain connected to said backbone member, said locking chain adapted to be located around a portion of the front wheel of the motorcycle and adapted to be locked into position by a separate locking mechanism.

7. The motorcycle security stand as defined in claim 1 including:
resilient foot pads mounted on said base, said resilient foot pads to be in direct contact with the supportive surface and space said base slightly from the supportive surface.

8. The motorcycle security stand as defined in claim 1 wherein:
said supporting rib assembly comprising a plurality of spaced apart rib members with there being a plurality of said rib members for said right side support and a plurality of said rib members for said left side support, corresponding rib members of said right side support are to connect with corresponding rib members of said left side support in conjunction with said backbone member.

9. The motorcycle security stand as defined in claim 1 including:
a fastener extending through said backbone member adapted to penetrate an exterior structure, the head of said fastener being covered by the front wheel of the motorcycle when the front wheel of the motorcycle is located in conjunction with said backbone member thereby preventing access to said fastener.

* * * * *